(12) United States Patent
Pollock et al.

(10) Patent No.: US 11,325,043 B2
(45) Date of Patent: May 10, 2022

(54) UTILIZING MULTIPLE INPUT SOURCES FOR GENERATING GAMEPLAY LOCATIONS

(71) Applicant: Microsoft Technology Licensing, LLC, Redmond, WA (US)

(72) Inventors: Holly Helene Pollock, Woodinville, WA (US); Stacy Jiayan Chen, Redmond, WA (US); Guillaume Philippe Marie Le Chenadec, Redmond, WA (US); Michael Meincke Persson, Redmond, WA (US); Jason Matthew Cahill, Woodinville, WA (US); Torfi Frans Olafsson, Redmond, WA (US); Jesse D. Merriam, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 16/875,513

(22) Filed: May 15, 2020

(65) Prior Publication Data

US 2021/0354040 A1 Nov. 18, 2021

(51) Int. Cl.
*A63F 13/655* (2014.01)
*A63F 13/213* (2014.01)

(52) U.S. Cl.
CPC .......... *A63F 13/655* (2014.09); *A63F 13/213* (2014.09); *A63F 2300/8082* (2013.01)

(58) Field of Classification Search
CPC .............................................. A63F 2300/8082
See application file for complete search history.

(56) References Cited

U.S. PATENT DOCUMENTS

| | | | |
|---|---|---|---|
| 9,230,368 B2 | 1/2016 | Keane et al. | |
| 9,352,216 B2 | 5/2016 | Mullen | |
| 9,384,594 B2 | 7/2016 | Maciocci et al. | |
| 9,454,849 B2 * | 9/2016 | Mount | A63F 13/32 |
| 9,685,005 B2 | 6/2017 | Kjallstrom et al. | |
| 9,696,547 B2 | 7/2017 | Kinnebrew et al. | |

(Continued)

FOREIGN PATENT DOCUMENTS

| | | |
|---|---|---|
| WO | 2015192117 A1 | 12/2015 |
| WO | 2016099906 A2 | 6/2016 |
| WO | 2017160566 A1 | 9/2017 |

OTHER PUBLICATIONS

"SwiftShot: Creating a Game for Augmented Reality Apple Developer Documentation", Retrieved from: https://developer.apple.com/documentation/arkit/swiftshot_creating_a_game_for_augmented_reality, Jan. 19, 2019, 4 Pages.

(Continued)

*Primary Examiner* — Seng H Lim
(74) *Attorney, Agent, or Firm* — Rainier Patents, P.S.

(57) ABSTRACT

The present concepts relate to placing gameplay locations in the real world, where gameplay elements can be generated at the gameplay locations. One example categorizes types of physical elements described in geolocation data, and determines scores for the physical elements based on the categorizations. Gameplay locations can then be utilized according to the scores, and the scores can be continuously refined through user or moderator interaction with gameplay elements that may be generated at the gameplay locations.

20 Claims, 9 Drawing Sheets

(56) References Cited

U.S. PATENT DOCUMENTS

| | | | |
|---|---|---|---|
| 9,782,668 B1 | 10/2017 | Golden et al. | |
| 9,916,693 B1 | 3/2018 | Carr et al. | |
| 10,603,578 B2* | 3/2020 | Pickover | G16H 10/00 |
| 10,603,579 B2* | 3/2020 | Pickover | A63F 13/216 |
| 2012/0212484 A1 | 8/2012 | Haddick et al. | |
| 2012/0315992 A1 | 12/2012 | Gerson et al. | |
| 2013/0178257 A1* | 7/2013 | Langseth | A63F 13/812 463/4 |
| 2013/0328927 A1* | 12/2013 | Mount | A63F 13/213 345/633 |
| 2014/0237578 A1* | 8/2014 | Bryant | G06F 3/04845 726/7 |
| 2017/0270711 A1 | 9/2017 | Schoenberg | |
| 2018/0045963 A1 | 2/2018 | Hoover et al. | |
| 2018/0311572 A1* | 11/2018 | Pickover | A63F 13/25 |
| 2018/0311573 A1* | 11/2018 | Pickover | G16H 40/63 |
| 2018/0321894 A1 | 11/2018 | Paulovich et al. | |
| 2018/0361248 A1 | 12/2018 | Nomura et al. | |
| 2020/0264757 A1 | 8/2020 | Cahill et al. | |

OTHER PUBLICATIONS

"Tango (Platform)", Retrieved from: https://en.wikipedia.org/w/index.php?t, Apr. 27, 2017, 6 Pages.

"International Search Report and Written Opinion Issued in PCT Application No. PCT/US2020/015990", dated May 13, 2020, 12 Pages.

Schussler, Nadine, "Processing GPS Raw Data Without Additional Information", Retrieved from https://www.research-collection.ethz.ch/bitstream/handle/20.500.11850/9472/eth-30636-01.pdf?sequence=1, Dec. 31, 2009, 17 Pages.

"Deep Learning Creates Earth-like Terrain by Studying NASA Satellite Images", Retrieved from: https://www.technologyreview.com/s/608316/deep-learning-creates-earth-like-terrain-by-studying-nasa-satellite-images/, Jul. 20, 2017, 9 Pages.

"Make the world your playground", Retrieved from: https://web.archive.org/web/20200106051532/https:/cloud.google.com/maps-platform/gaming/, Jan. 6, 2020, 14 Pages.

"Minecraft Earth FAQs", Retrieved from: https://web.archive.org/web/20200107104411/https:/help.minecraft.net/hc/en-us/articles/360033744412-Minecraft-Earth-FAQs, Jan. 7, 2020, 10 Pages.

Coldewey, Devin, "Minecraft-earth-makes-the-whole-real-world-your-very-own-blocky-realm", Retrieved from: https://techcrunch.com/2019/05/17/minecraft-earth-makes-the-whole-real-world-your-very-own-blocky-realm/, May 17, 2019, 18 Pages.

Orland, Kyle, "Niantic rolls out suggestion system for new Pokemon Go locations", Retrieved from: https://arstechnica.com/gaming/2018/09/niantic-rolls-out-suggestion-system-for-new-pokemon-go-locations/, Sep. 14, 2018, 7 Pages.

Soute, et al., "Head Up Games: combining the best of both worlds by merging traditional and digital play", In journal of Personal and Ubiquitous Computing, vol. 14, Issue 5, Dec. 17, 2009, pp. 435-444.

Weth, et al., "Virtual Location-Based Services:Merging the Physical and Virtual World", In Proceedings of IEEE International Conference on Web Services, Oct. 10, 2013, pp. 113-120.

Youm, et al., "Design and development methodologies of Kkongalmon, a location-based augmented reality game using mobile geographic information", In EURASIP Journal on Image and Video Processing volume, Jan. 3, 2019, pp. 1-11.

"Non Final Office Action Issued in U.S. Appl. No. 16/277,465", dated Apr. 6, 2020, 15 Pages.

Poupyrev, Ivan, "3D Manipulation Techniques", In Proceedings of SIGGRAPH 27th Annual Conference on Computer Graphics and Interactive Techniques, Jul. 23, 2000, 31 Pages.

"International Search Report and Written Opinion Issued in PCT Application No. PCT/US21/022441", dated Jun. 21, 2021, 11 Pages.

* cited by examiner

UTILIZING MULTIPLE INPUT SOURCES FOR GENERATING GAMEPLAY LOCATIONS

BACKGROUND

Recent advances in mobile device and/or near-eye display (NED) device technologies along with augmented reality (AR) have resulted in new opportunities for computer game designers. Specifically, by utilizing a global positioning system (GPS) component in combination with a camera on such devices, imagery of a particular location in the real world that is captured by the camera can be augmented by generated elements, in order to give the impression that the augmented elements coexist along with the real-world imagery. Furthermore, the generated elements may be capable of being manipulated by a user of the device, and in certain implementations, may be utilized as part of an augmented reality game that can be played via the device.

However, in situations where a user is expected to interact with the generated elements, such as during gameplay situations, certain locations in the real world can be problematic for the placement of generated elements. In particular, certain locations may potentially introduce risk to the user, if the user were to attempt to interact with a generated element at that location. For example, a generated element placed in the middle of a highway would not be an effective location, due to the high risk involved in the location. Furthermore, existing classification methods for determining the level of risk associated with a potential location for a generated element do not provide a full picture of how effective the game location is for overall user enjoyment. As such, there remain difficulties in determining effective locations where the placement of generated elements enhance a user's enjoyment of the game.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1B:
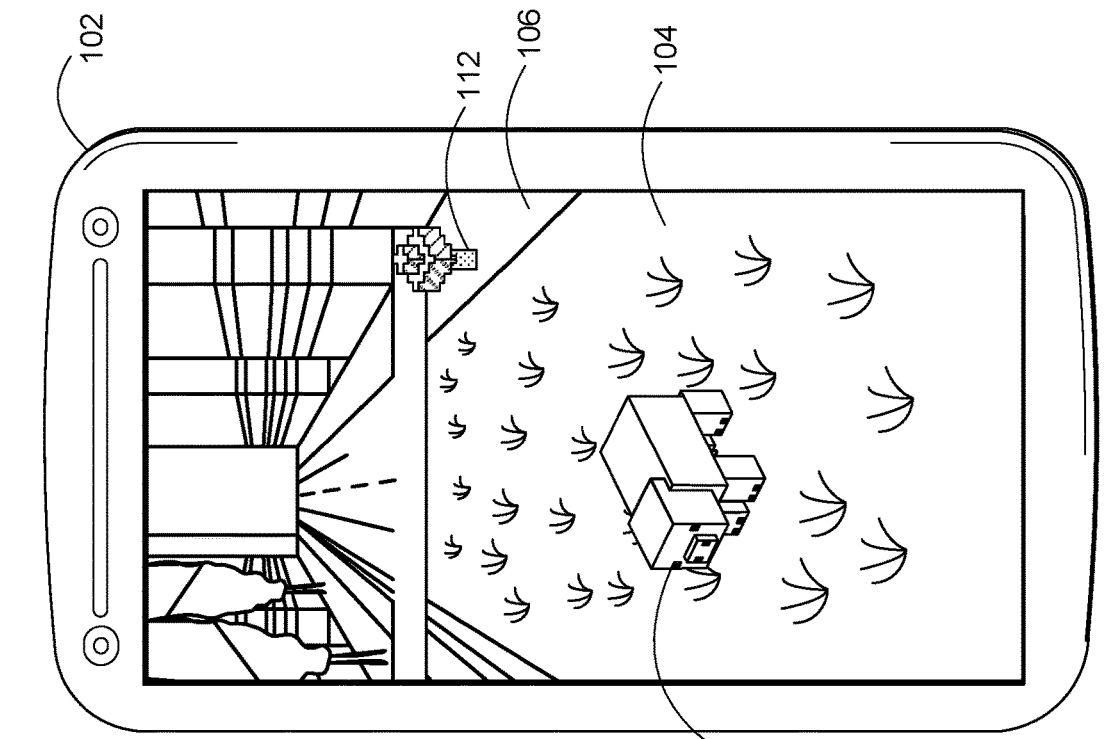
FIGS. 1A and 1B illustrate an example scenario that is consistent with some implementations of the present concepts.

This discussion relates to a system that can use a variety of input data in order to determine an appropriate categorization of geolocation data and provide both virtualized and augmented reality experiences for a user utilizing the geolocation data. In one implementation, the geolocation data may be real-world data that can represent physical elements in an environment. Based at least upon the geolocation data and location information associated with the device, generated content can be associated with real-world locations.

In certain implementations, such generated content can be depicted by generating a virtualized representation of the real world location with the generated content placed within the virtualized representation. Alternatively, the generated content can be overlaid on real-world imagery in an augmented fashion (such as via capturing of real-world imagery utilizing a camera) and the generated content can be interacted with by a user. In either situation, information related to the physical environment can be processed in order to detect acceptable locations for the placement of generated content within the physical environment.

For purposes of this disclosure, it is to be assumed that generated content can be overlaid on real-world imagery in an augmented fashion, however, it is to be understood that the concepts disclosed herein can also be applied to a virtualized depiction of the real world. For example, by way of GPS data, a virtualized representation of the world surrounding a user can be depicted on a screen of a device. Then, generated elements can be displayed on the virtualized representation of the world, and as the user moves through the real world, the virtualized depiction of the world displayed on the device can change to follow the movement of the user, based on the GPS data. The generated elements can therefore be interacted with via the virtualized depiction, rather than viewing the real world through the device's camera and having generated elements augmented onto the real world view.

Such generated content can include graphics that are representative of objects, people, biometric data, effects, etc., that are not physically present in the environment. Generated content can include two-dimensional (2D) graphics, three dimensional (3D) objects, and/or content associated with applications. For example, generated content can be a 3D generated element that can augment a physical, real-world scene (e.g., a park within a city), such as by displaying a generated element (e.g., a cat, dog, or in some implementations, elements that may correspond to gameplay characters, such as a Minecraft pig) in a manner that overlays the real-world scene. As used herein, reference to a "generated element" may include virtualized or photorealistic representations of content that may be placed within a representation of the real world.

The generated elements can be designed to allow a user to interact with the generated elements. In certain implementations, the generated elements may be elements that can be associated with gameplay, and a user can interact with the elements at identified locations in the real world to achieve certain actions within the game. For example, the generated elements can be a "tappable" element, which may be a gameplay item that a user can interact with in order to acquire the element within the user's inventory.

Alternatively, the generated elements can be an "encounter" element, which may be a "virtual world" or a collection of various gameplay elements that can provide multiple points of interaction with the user. Such encounter elements may have associated sizes set for the encounters, and can be classified as a peaceful encounter, a neutral encounter, or a hostile encounter, depending on the types of interactions the encounter area have for gameplay. For example, a hostile encounter may have high-level mobs, and the encounter type can be used as a warning to low-level players that the encounter may best be avoided. However, it is to be appreciated that other types of encounter elements can be provided, and the above types are provided only as an example. Furthermore, there may be additional types of generated elements, such as static elements that may be purely decorative.

In order to allow a user to interact with the generated elements, a gameplay location may be identified and subsequently generated within the real-world environment where the placement of such elements allows the user interaction. Once the gameplay locations are generated, the system can determine the proper placement of generated elements at the locations, and when a user approaches the location in the real world, the device can display the generated elements to provide gameplay functionality. Alternatively, in certain implementations, the gameplay locations can be generated, and individual users can place generated elements such as tappables or encounters into the gameplay locations, rather than having the system determine the placement of generated elements.

Certain locations within the real world, however, are either not ideally suited for gameplay purposes, or may be areas that potentially carry risk for users. For example, certain types of physical areas may be inherently associated with risk, such as areas that are roadways, subways, or terrain that exhibits a large amount of variation of elevation (e.g., a cliffside or a deep ditch). As these types of areas present greater risk to a user, certain identified locations may be classified as "excluded" zones, and the system can avoid generating a gameplay location in these excluded zones. However, it is to be appreciated that excluded zones may not only be limited to environments that present risk, but also environments where the placement of gameplay locations may be disrespectful, such as a war memorial.

In addition to excluding certain areas from being included in the list of gameplay locations, generated gameplay locations can also have a risk evaluation score associated with the location, which may be updated over time based on changing conditions and/or user feedback or moderator feedback. For example, a gameplay location may be generated in a location that appears low-risk, but the mapping data associated with that location may be outdated. As such, input from users (e.g., location information, such as GPS data, of where the user is positioned relative to the location, direct feedback, or low traffic indicators associated with users), along with moderator feedback, can be received over time, which can cause the risk evaluation score to be updated to reflect the current physical environment. In some implementations, the updated risk evaluation score may then exceed a risk threshold, and the gameplay location may be updated to be an excluded zone. Such constant user feedback can be utilized to provide an evolving risk assessment mechanism for determining whether a generated gameplay location should continue to exist.

Finally, there may be locations around the world where mapping data is sparse or does not exist. Specifically, in certain parts of the world, satellite imagery may only be available, and highly detailed geolocation data may be unavailable. In such an instance, machine learning can be employed to analyze the satellite images for the given region, and gameplay locations can be generated for the region based on the analysis of the satellite images. For example, the machine learning algorithm may determine that certain sections of the satellite images specify highway systems, and can automatically mark those areas as excluded zones and remove them from consideration as potentially usable areas, while allowing gameplay locations to be generated in areas surrounding the excluded zones.

As such, processes disclosed herein can utilize a combination of numerous types of different data in order to effectively determine whether a location is usable in gameplay based on a determined amount of risk. Furthermore, the processes can quantify the level of risk based on a variety of data, such as user data, geolocation risk scores, and/or moderator input, and continuously adjust a score that may represent the quality of the location in terms of gameplay and user experience.

Therefore, the processes disclosed herein provide a technical solution to an issue of determining whether a real-world location is viable for the placement of gameplay elements, taking into account the physical details regarding the real-world location, and an evaluation of the quality of the location can be determined over the course of gameplay interaction. Based on the evaluation, locations and/or generated elements can be modified as necessary, thus improving player experience in ways that go beyond one-dimensional considerations.

FIG. 1 depicts a device 100 that may be used with the location generation process. Device 100 may be manifested as a mobile device 102, whereby mobile device 102 can display real-world imagery utilizing a camera of the mobile device. However, it is to be understood that device 100 can also be any sort of display device that can receive image input and can be manipulated by a user. For example, device 100 may also be a near-eye display (NED) device, such as a Microsoft HoloLens, where the NED device may overlay the generated imagery over the visible real world as viewed through the device. Alternatively, device 100 may be a tablet device that can receive real-world imagery via a paired external camera, or can depict a virtualized representation of the real world on a screen of the device.

Figure 1A:
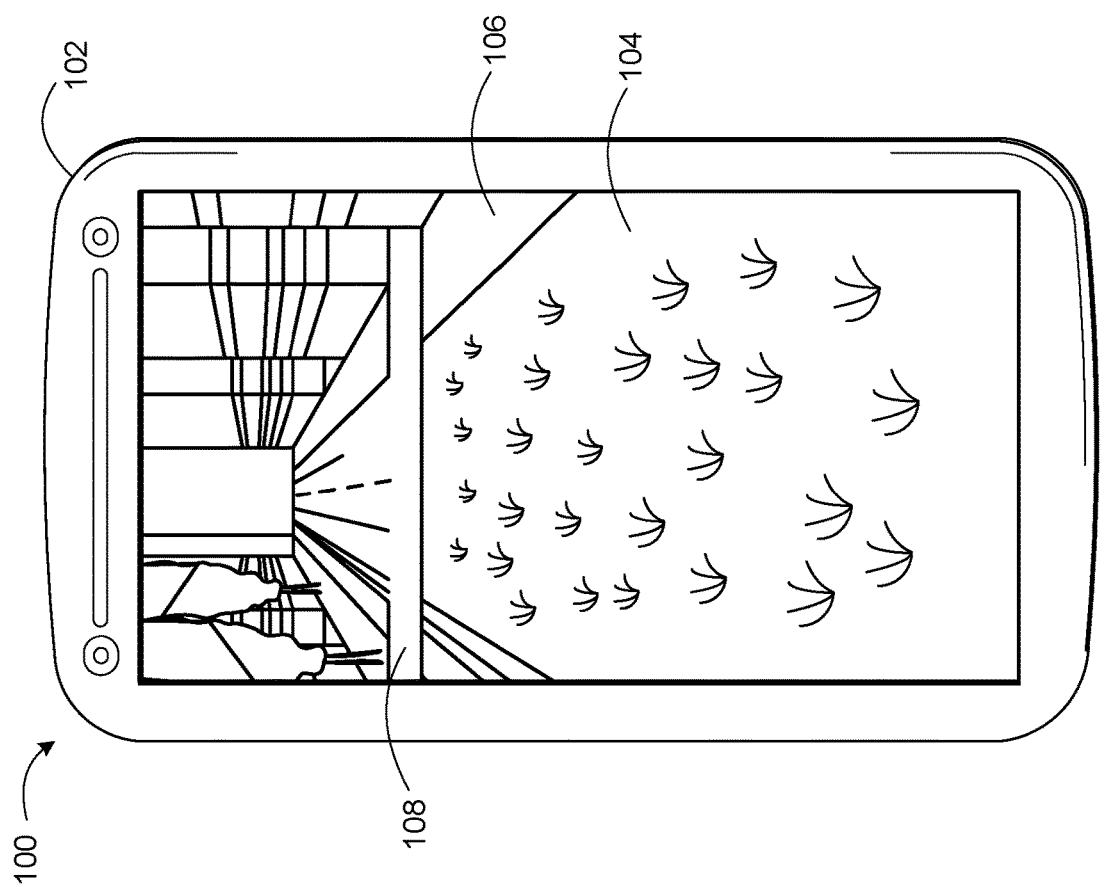

As depicted in FIG. 1A, mobile device 102 may utilize a camera of the mobile device to capture a real-world scene, which may include various elements such as a grassy park 104, sidewalk 106, and roadway 108. The device may be configured to load locational data from a database that is accessible via the networking capabilities of the device. For example, the system may determine, based on GPS data, that the device is within the greater Seattle area. Then, the system can access a database to download a set of tappables and/or encounters that correspond to the gameplay locations corresponding to the GPS data.

For example, as depicted in FIG. 1B, once the location of mobile device 102 is determined, a database of gameplay locations can be accessed in order to determine whether any tappables and/or encounters should be displayed. The database may be populated with data that associates geolocation data with scores associated with the geolocation data, such as scores that specify overall usability or a relative grade of a location represented by the geolocation data. As a result of this process, data associated with the location can be utilized to indicate that roadway 108 may be an excluded zone, while grassy park 104 and sidewalk 106 may have locations that can be used with gameplay elements. As such, through a placement process that is described in greater detail below, an tappable 110 (e.g., a neutral pig mob) can be generated on grassy park 104, while another tappable 112 (e.g., a tree) can be generated on sidewalk 106. The user of mobile device 102 can then interact with tappables 110 or 112, for purposes of gameplay.

As noted earlier, elements may be interacted with via an AR mode, where the elements may be generated in an augmented fashion over an image of the real world, such as an image captured by a camera of a device. Alternatively, the elements may be generated and placed on a virtualized representation of the real world that can be displayed on a display of a device, such that a user can interact with the elements via interactions with the display of the device (e.g., tapping a screen, dragging a finger on a screen, etc.).

As an alternative to determining the location of the mobile device by way of the GPS data, mobile device 102 may determine whether any image anchors exist within the current scene that is captured by the camera. Such image anchors can be determined, for example, by detecting feature points located within the current scene, and comparing the feature points against a repository of feature points that may be associated with image anchors. Once the image anchors in the view are determined, any tappables and/or encounters that are associated with the image anchors can be downloaded and displayed via the display of the device. The placement of the tappables and/or encounters can be performed in accordance with a determination that the physical region corresponding to the GPS data contains generated gameplay locations.

FIGS. 2A-2D depict an example scenario of processing geolocation data in accordance with the location generation process. Geolocation data can be received by way of a data source, which may be a database that stores data associated with a world map. The geolocation data can describe elements in a physical environment, such as the location of streets, highways, sidewalks, buildings, parks, and a variety of points of interest (POI), for example. In one implementation, such a data source may be an OpenStreetMap database or a Microsoft Azure Maps database. Alternatively, in some implementations, the geolocation data that may be utilized can be a combination of geolocation data retrieved from multiple data sources, such as to improve coverage of the world map in regions that lack suitable mapping information. In such an instance, the geolocation data from the multiple data sources can be combined to provide comprehensive coverage for an area.

When receiving geolocation data from the data source, the geolocation data may be divided into sections of the world map called tiles or zones, and the location generation process may be performed on a zone-by-zone basis in order to process the entirety of the world map. A zone, for example, could be half of the "Greater Seattle Area," or may be limited to particular dimension, such as a 100×100 square area. Upon importing of the geolocation data from the data source, the system can parse each zone of geolocation data to determine the various details associated with the physical environment included within that zone. In one implementation, the geolocation data may represent the physical elements in the environment as a variety of points, lines, and polygons. For example, a point may represent a particular point of interest, such as a museum or a fountain, while a line may represent a roadway or highway. Once this data is imported, the system can parse the data differently depending on the shape and the underlying identifier associated with that shape.

Figure 2A:
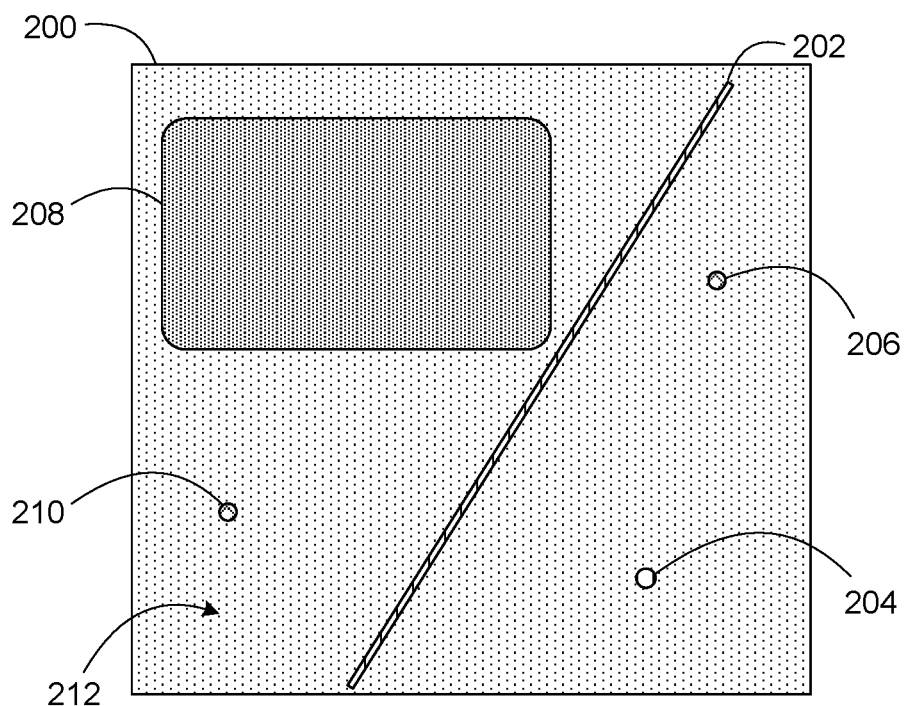
FIGS. 2A-2D illustrate example processes that are consistent with some implementations of the present concepts.

FIG. 2A depicts an example scenario for parsing geolocation data, whereby a geolocation data zone 200 may be received that can include 5 unique elements within the zone, specified in terms of points, lines, and polygons. The 5 unique elements within zone 200 may represent real-world elements, such as a highway 202, a military base 204, a fountain 206, a shopping center 208, and a park 210. The process may parse zone 200, and elements 202-210, into at least four possible categories: 1) "known usable," 2) "known risky," 3) "unknown," or 4) "excluded."

The classification of the various elements in the physical environment according to these categories can be utilized by the location generation process to determine appropriate locations for placement of gameplay elements. It is to be appreciated that alternative classifications can be utilized, and in some implementations, a sliding scale can be utilized to determine when a "known risky" category automatically becomes "excluded," and in some instances, "known risky" and "excluded" may be combined, such that any location with risk is automatically excluded.

By determining an identifier associated with the physical element as provided by the geolocation data (i.e., does the data specify that it is a roadway or a fountain), a lookup table can be created where each physical element may be categorized according to the categories set forth above. For example, certain physical elements may be marked as an "excluded" element, such as highway 202. Alternatively, if the physical element is not excluded and a type identifier is associated with the physical element, a risk score can be associated with the physical element based on the type of physical element. For physical elements that do not have a type identifier that is recognized by the process (i.e., the geolocation data uses a new type identifier), the physical object may be associated with the "unknown" category.

The risk score that may be associated with the physical element can be pre-defined by the data source to be a set risk score according to the classification of the physical element. For example, a roadway element may have a high risk score, so for any roadway elements that are discovered in parsing the geolocation data, the lookup table can be populated with the roadway elements, and the pre-programmed risk score that may be associated with roadway elements can be assigned to the specific element in the lookup table. Likewise, if the geolocation data indicates that the physical element is a POI defined as a memorial, a lower risk score may be pre-defined to be the set risk score for memorial elements. While the memorial may not be an ideal area for a gameplay location, the relative risk to a user can be less than placing the gameplay location on a roadway. In an alternative implementation, the risk score pre-defined by the data source may be overruled by local settings, in order to use a more specialized scoring system. Such local settings can be preconfigured by, for example, a developer or moderator of the game.

Based at least on the associated risk score, the parsed physical element can then be associated with one of the categories, which may be defined according to threshold risk score values. For example, utilizing a 0-1 risk scale (with a risk score of 1 being the highest risk to users), the process may classify physical elements that have a risk score of less than 0.3 as "known usable" elements, and gameplay locations can be readily generated in these locations. Similarly, the process may classify physical elements that have a risk score ranging from 0.3-0.6 as "known risky," while physical elements that have a risk score of 0.7 or higher may be excluded. Thus, in one example with reference to zone 200, fountain 206 may have a risk score of 0.1, park 210 may have a risk score of 0.2, shopping center 208 may have a risk score of 0.6, and highway 202 and military base 204 may have risk scores of 0.9.

Thus, as a result of parsing the geolocation data, the physical elements can be categorized into an initial priority ranking of areas to utilize for the placement of gameplay locations. For example, areas with the lowest risk score may be awarded the highest priority to use for the placement of gameplay elements. Additionally, risk score thresholds may be defined, such that encounters may be generated in areas that are below the risk threshold, whereas tappables can still be generated in areas that exceed the threshold, as long as the area does not constitute an excluded area.

This initial priority ranking can be fine-tuned through an iterative feedback process that can utilize user and moderator reporting, along with locational data (e.g., GPS data, cellular triangulation, WiFi, dead reckoning, etc.), in order to constantly define and redefine a calculated score for areas within the zone. In one implementation, the priority score P may be a calculated according to:

$$P = W_1 * (\text{risk score}) + W_2 * (\text{user score}) + W_3 * (\text{moderator score})$$

where:
- the risk score may be the current risk score that may be received from the data score as part of the geolocation data or the risk score specified in the local settings;
- the user score can be based on feedback and locational data that may be collected during user interaction with the game;
- the moderator score may be various settings provided by the moderator that can influence the priority score; and
- $W_1$, $W_2$, and $W_3$ are weighted values, and in some implementations, $W_3 > W_2 > W_1$.

However, it is to be appreciated that other functions can be utilized to change the priority score for an area, instead of a linear function as set forth above. For example, a decision tree could be utilized that can select different branches of the tree depending on weighted values. Alternatively, a neural network could be utilized that may be trained on initial data received from the data source and gameplay data that can be harvested during gameplay.

Each of the risk score, the user score, and the moderator score can evolve over time as a result of ongoing gameplay, and the priority score can reflect a measurement of "quality" of the gameplay location. Referring first to the risk score, while the initial parsing of the geolocation data may yield a risk score that is defined by either the data source, or defined according to local settings provided by a developer or moderator, it is to be appreciated that the parsing of the geolocation data may not be a one-time occurrence, and that updates to geolocation data may be received over time from the data source. As such, the risk score may be updated based on new scores that can be received from the data source.

Alternatively, the local settings which may be used to override the scoring specified in the geolocation data can also be adjusted as gameplay continues. Specifically, initial values that had been set by a developer or moderator of the game may be updated based on observations regarding the gameplay. For example, a hiking trail in a park may have been initially classified with a risk score value, but repeated use of the hiking trail in the game may have resulted in damage to the park by users going off-trail. As a result, a moderator or developer may update the local settings for hiking trails to increase the risk score, thereby reducing the generation of gameplay elements for hiking trails, or excluding hiking trails entirely. As such, an updated risk score can be utilized in the overall calculation of the priority score.

Referring next to the user data, this aspect of the priority calculation can be used to determine how effective certain gameplay locations may be or whether certain gameplay locations may be problematic. Specifically, because geolocation data may be sparse for large portions of the world map, many of the zones that are received from the data source may have limited information about what exists within the zone. As a result, many zones may have areas that have high risk scores or may be considered "unknown" classification areas, simply because there is little to no mapping data regarding the zone. This may result in gameplay that may be less than optimal in these zones, as only certain generated elements may be placed in such areas given the high risk scores.

For example, due to the lack of mapping data, there may be physical elements provided within the geolocation data that are poorly classified (e.g., simply marked as "Object" or "POI" without specificity regarding the element), and therefore a default moderate risk score may be associated with these elements. However, as noted earlier, certain thresholds can be associated with different gameplay elements, yet because the poorly classified physical elements do not have a low risk score, they may never be utilized for gameplay elements as their default moderate risk score may not be lower than the threshold risk value. Alternatively, they may only be used for one type of gameplay element, such as a tappable, which may be placed in higher risk areas.

As such, in one implementation, GPS data associated with users can be utilized in the calculation of the priority score, such that even if a zone has a low resolution of mapping data, certain areas of the zone that appear popular to users based on their GPS data can have their priority scores adjusted. For example, by recording where a user is standing when interacting with a gameplay element, and what gameplay elements seem to exhibit a high amount of interaction, a user score can be created that can influence the priority score by way of the priority score calculation. Conversely, the priority score of a location can be further lowered where only a small percentage of users choose to play. In one implementation, the feedback information received from the users may be weighted toward recency, such that more recent data can have a greater impact on the priority score than older data.

It is to be appreciated that different types of locational data can be utilized in the calculation of the priority score instead of or in addition to GPS data. For example, location determination utilizing WiFi, cellular triangulation, and/or dead reckoning may be utilized in order to determine the location of a user, for purposes of calculating the priority score.

Finally, referring to the moderator data, this aspect of the priority calculation can be a scoring value that is based on moderator input regarding a specific zone or area of the geolocation data. For example, a moderator may be able to utilize a graphical user interface (GUI) of a moderator tool, described in greater detail below, to specify an exclusion area over otherwise usable areas. This may be, for example, in response to user reports of risky encounter locations or reports that a generated location is actually on private property. Such reports can be generated via a user interface of the client device or via a website associated with a server. The moderator can additionally override the risk scores for particular real-world elements or may set a limit on the priority score to ensure that the priority score for a given gameplay location does not exceed a certain amount.

It is to be appreciated that the calculated priority score may be heavily weighted toward the risk score and the moderator scores during initial gameplay, and indeed, the first placement of gameplay data may rely solely on the risk scores, absent any user data or moderator inputs. However, the user score and moderator score can begin to influence the priority score as various data points are received from the users, and moderators provide refinement settings. Furthermore, the system may update gameplay locations more frequently during early game play, in order to utilize improved priority scores that may allow a larger number of gameplay locations to be generated.

Turning once again to FIG. 2A, the geolocation data received from the data source can be parsed to identify areas that can be possible candidates for generating gameplay locations. For example, with reference to FIG. 2A, highway 202 and military base 204 may be marked as excluded elements, as gameplay locations should not be generated in proximity to these areas. Shopping center 208 may be classified as a "known risky" area, as the amount of vehicular traffic in and around the shopping center may be problematic for users who are attempting to interact with gameplay elements generated within the shopping center, and this area may therefore have a moderate risk score. Fountain 206 and park 210 may be classified as "known usable," as these real-world areas are generally considered to be a low risk area for allowing users to interact with generated gameplay elements. Finally, in certain instances, the areas of zone 200 that are not represented by a point, line, or polygon may be categorized as "unknown" areas, due to the lack of geolocation data that may specify what is located in these regions. Thus, unknown area 212 may surround the various known physical elements.

Figure 2B:
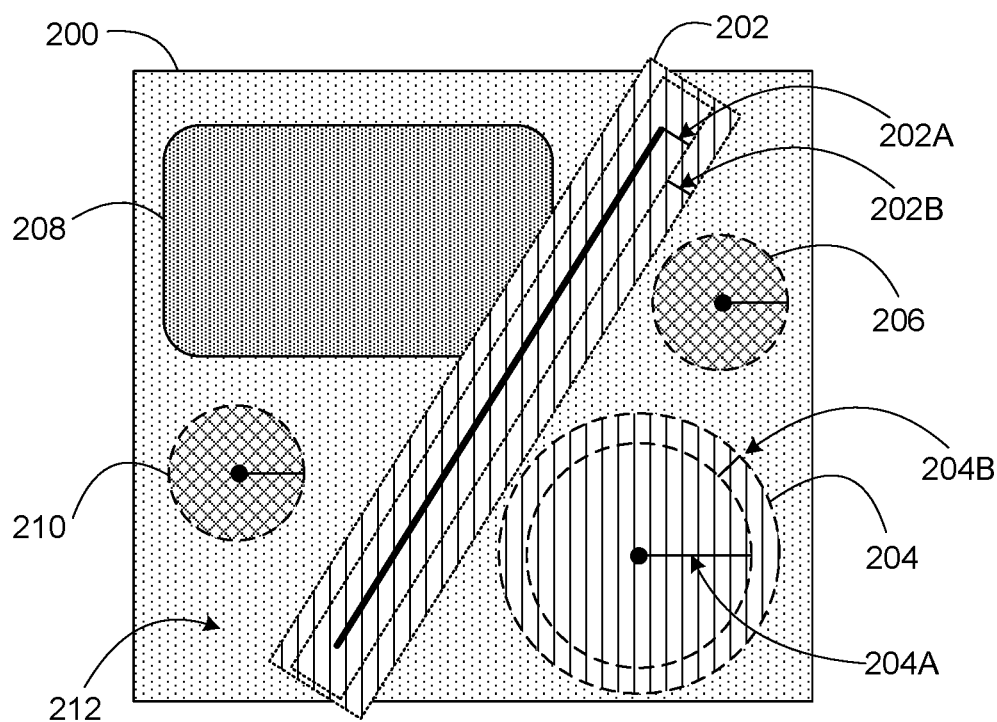

FIG. 2B depicts the parsing of the geolocation data that may be received from the data source, for use in identifying possible gameplay locations. In order to determine where to generate the gameplay locations, the process can first utilize the knowledge of what each point, line, and polygon represents, and can expand the points and lines by a set amount into suitable polygons or circles, respectively, in order to adequately define an area for the physical element that the points and lines represent.

The expansion of points and lines may utilize moderator-provided values that specify certain sizing and/or radiuses of the expanded shapes based on the type of point and line (i.e., a line that represents a highway may be configured to have a wide polygon shape using a set width in order to sufficiently encompass the whole highway in the real world). For example, with reference to FIG. 2B, highway 202 may be represented by a line, and to expand into a suitable polygon, a width 202A may be defined for highways or other such roadways, in order to create a polygonal region surrounding the line. Military base 204 may have been represented by a point, and to expand the point into a suitable circle, a radius 204A may be defined in order to create a circular region surrounding the point. Similarly, fountain 206 and park 210, which may have been represented by a point, can be expanded into suitable circular areas, while shopping center 208 need not be expanded as the geolocation data already provided a polygonal shape for this physical element.

The parsing process can then provide buffer regions where desired in order to ensure that gameplay locations are not generated near excluded zones or other risky areas. For example, a minimum radius buffer may be provided around excluded elements, in order to ensure that a generated location does not encroach the excluded element and potentially place a user at risk. In certain implementations, larger radius and/or buffer values can be utilized when the item specified in the geolocation data is a high-risk object, such as areas associated with a military or government complex, thereby providing a greater zone of exclusion for these items. For example, as highway 202 and military base 204 may have been classified as excluded elements, additional buffer widths and/or radiuses can be applied, as exemplified by buffers 202B and 204B in FIG. 2B.

Having parsed the geolocation data to determine possible areas within each zone of geolocation data, the process can then determine placement of gameplay location that can be used with tappables and encounters. The placement process for tappables and encounters may be concurrently run with different requirements, as certain levels of user interaction may be different depending on whether the generated element is a tappable or an encounter. For example, an encounter may require that the user have sufficient space around the encounter in the physical world, as the user may need to pivot around the generated element in order to battle or otherwise interact with the encounter. As such, different criteria can be utilized in order to determine whether an area is appropriate for the placement of a tappable or an encounter. For example, tappables may be generated in areas that may have a wide range of risk scores, while encounters may be limited to areas that have a low amount of risk.

Once each area within zone 200 has been parsed (e.g., highway 202, fountain 206, etc.), locations can be determined within the areas as being potential tappable locations or potential encounter locations. Tappables placement and encounters placement may vary in placement techniques, depending on needs of the developers. In one implementation, encounters placement may be stricter in requiring a low risk environment. Because the amount of user interaction with encounters can be more extensive than with tappables, the encounters placement algorithm may place encounters only within areas that may be classified as "known usable." Furthermore, there may be locations that can serve as a location for both tappables and encounters. In one implementation, the system can prioritize generation of an encounter in these locations, due to the stricter requirements for placement of encounters.

Furthermore, there may be developer or moderator-defined input values that control placement of tappables and encounters. For example, a target count of each gameplay element may be defined, such as 20 tappables and 3 each of the different types of encounters (peaceful, neutral, hostile). Each tappable and encounter may also have a refresh rate, which may define the length of time that the generated element can remain active before despawning. Areas within zone 200 may also have settings that control opening and closing hours of the areas for gameplay purposes. For example, parks typically have closing hours, and as such, certain areas may only be activated for location generation if the areas are currently "open" according to a defined time range. A minimum proximity value may also be utilized to define a distance that may be enforced between locations. This minimum proximity value may be provided by a developer or moderator in order to ensure that crowding of certain areas does not occur.

Finally, as will be described in greater detail below regarding FIG. 3A-3C, a moderator tool can also be used to implement override settings where temporary exclusion zones may be placed, such as in response to a police incident at a local park. Such exclusion zones may be temporary, and may be manually removed or may be removed after a set period of time has elapsed. Exclusion zones can also be automatically imposed based at least on user feedback during gameplay. For example, a user may report a location as lackluster, or in some instances, dangerous to a user, which may be submitted via a reporting mechanism in the game.

A threshold number of reports may be defined, where if the threshold number of reports are received, an automatic exclusion may be applied to the location until a moderator can review the location. In certain implementations, when the threshold number of reports are received, the location can be despawned if there are no current users interacting with the location. However, if users are interacting with the location, the users can be allowed to continue interaction with the location until user interaction ceases, and then the location can be despawned and marked for exclusion so that it does not spawn again.

Thus, processing of a zone of geolocation data can result in the ranking of various areas within each zone, and these areas can be used for the placement of generated elements such as tappables or encounters. This process may be performed for each zone of geolocation data that may be received from the data source, and may be performed in advance so that users do not experience delay in arriving to a particular real-world location and having gameplay elements appear. For example, the various potential locations may be stored in a location database, and upon determining that a user's device is within a range of latitudinal and longitudinal coordinates associated with an area, the various potential locations for that area may be accessed and a determination can be made regarding the placement of particular tappables or encounters. It is to be appreciated that not every potential location may be activated, and only a subset of potential locations in a given zone may be activated at any one time.

Figure 2C:
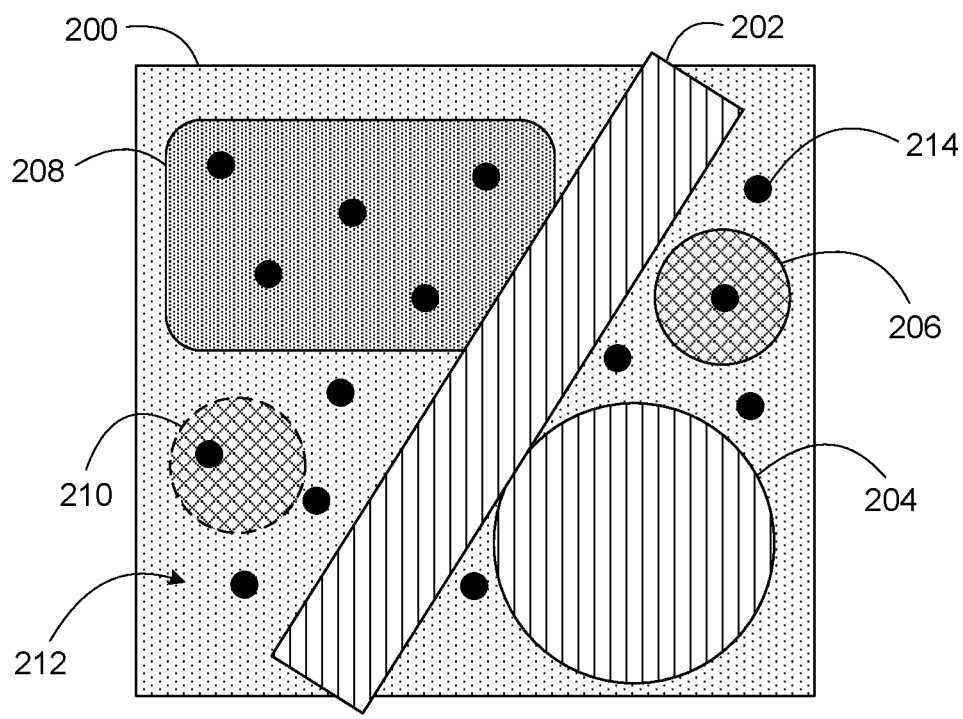

FIG. 2C depicts the placement of tappables within zone 200 according to a tappables placement algorithm. First, for each zone of geolocation data that may be received from the data source, the lookup table created as a result of parsing the geolocation data can be checked, and areas that are not classified as excluded areas can be ranked according to their priority scores. It is to be appreciated that during the first population of tappables, the priority scores for the areas may be solely represented by the risk scores associated with the physical elements within the zone, as there may be no user or moderator feedback data.

In one implementation, low risk areas such as park 210 may have the lowest risk score, resulting in the highest priority ranking being assigned to park 210. Fountain 206 may then be ranked behind park 210, while highway 202 and military base 204 may be filtered out of the listing of possible placement locations. However, it is to be appreciated that certain excluded areas can be set to bypass the exclusion filters, based at least on a moderator selecting the area for bypass. For example, military base 204, while normally excluded, may have a family-day event, and for this specific event, the military base may be opened for the placement of gameplay locations.

Once the areas in the zone have been ranked, a check can be performed to determine whether it is worthwhile to generate gameplay locations within the ranked areas. In one implementation, proximity to a "population" node provided with the geolocation data may be checked, and if the zone is within a set threshold distance from a population node, tappables can be generated within the zone. The tappables may be generated by randomly allocating points among the available areas of zone 200, and as depicted in FIG. 2C, tappables 214 (only one shown for ease of depiction) may be placed within fountain 206, shopping center 208, and park 210.

Furthermore, in one implementation, tappables can also be randomly generated within unknown area 212, however, a developer or moderator may provide input as to whether "unknown" classified areas are of sufficiently low risk to warrant the generation of tappables. Finally, any tappables that may have been generated within any excluded areas, such as highway 202 and military base 204, may be removed. The final list of generated tappable locations can then be provided to a database, which may record the location and the generated tappable, such that when a user encounters the location, the tappable may be visible.

Figure 2D:
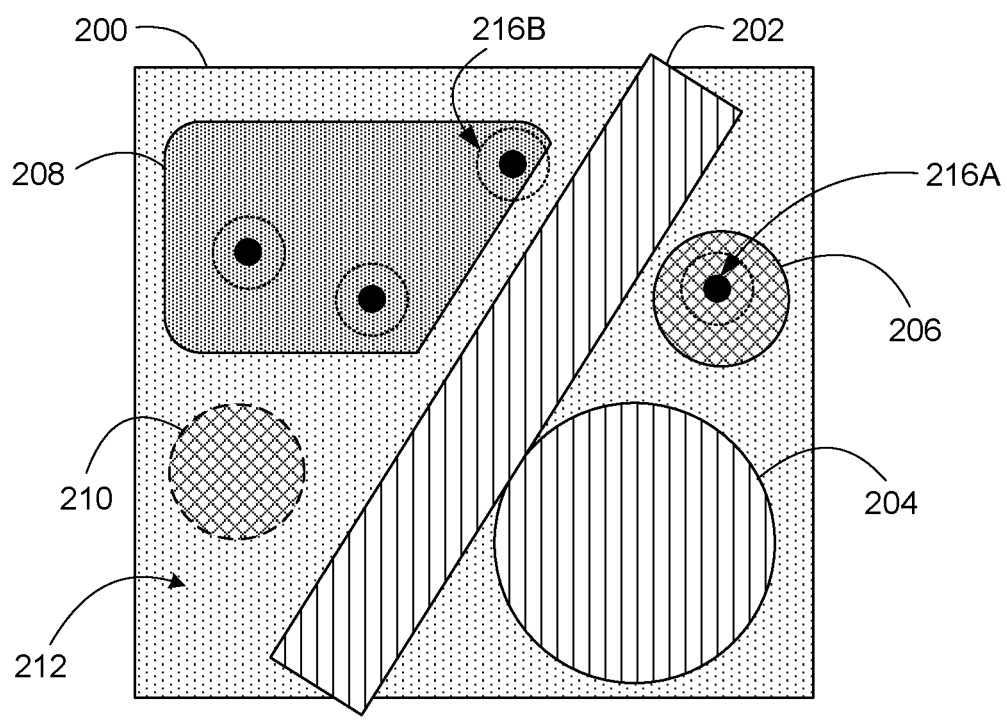

FIG. 2D depicts the placement of encounters within zone 200, according to an encounters placement algorithm. The placement of encounters may rely on two values: a minRadius and a maxScore. The minRadius may reflect the total space that may be required in the area to have a specific type of encounter, and the maxScore may be a rating of how usable an area should be in order to generate a specific type of encounter. In one implementation, the maxScore may be a scale of 0 to 1, and may correspond to an area's risk score, such that a Tall16×16Hostile can only be placed in areas that have a risk score of less than or equal to 0.2.

Encounter types may be classified as either "short" or "tall," and these two types may also be classified as "peaceful," "neutral," or "hostile." That is, there may be a short/peaceful encounter or there may be a tall/hostile encounter, among other combinations. Each of these encounter types may have associated minRadius and maxScore values. For example, as encounters may vary in height and width, large amounts of space may be provided for "tall" encounters (i.e., so that the player can see the whole encounter), while less space may be required for "short" encounters. Likewise, a hostile encounter may require a larger minRadius than a peaceful encounter, in order to give the user sufficient space to move about the encounter. The system may store a table in a database of encounter data, such as an example table depicted below:

| Type | minRadius | maxScore |
| --- | --- | --- |
| Short4 × 4Peaceful | 4.5 | 0.8 |
| Short4 × 4Hostile | 6 | 0.7 |
| Tall4 × 4Neutral | 5 | 0.65 |
| Tall4 × 4Hostile | 7.5 | 0.6 |
| Short8 × 8Hostile | 8 | 0.5 |
| Short16 × 16Peaceful | 9.5 | 0.5 |
| Short16 × 16Hostile | 11 | 0.4 |
| Tall16 × 16Peaceful | 11.5 | 0.2 |
| Tall16 × 16Hostile | 13.5 | 0.2 |

Based on these types of encounters, zone 200 can be populated with encounters, depicted in FIG. 2D as encounter 216A and encounter 216B. The encounter placement algorithm can first merge all of the areas within zone 200 that overlap or adjacent, and once these areas are merged, can remove excluded areas from consideration for the generation of encounters. This step can result in the area corresponding to shopping center 208 being cropped, as part of highway 202 overlapped with shopping center 208, as depicted in FIG. 2C.

Next, the algorithm may determine whether any non-excluded remaining areas within zone 200 were merged, and if so, the merged sections may be broken up into their respective parts once again. For example, while a park and a fountain may overlap (i.e., the fountain is located within the park), the fountain and the park may have different risk scores, and so more generated elements may want to be placed near the lower risk score element. However, it is to be appreciated that the merged sections need not be unmerged, and the initial geolocation data can be used to define boundaries of each area, even when they are merged.

Then, for each of the possible encounter areas, the encounters table can be checked, and an encounter type may be selected for possible placement. In one implementation, the most restrictive encounter type (i.e., a Tall16×16Hostile) may be selected for possible placement. Next, the areas within zone 200 that are capable of being used for encounters can be selected, and the minRadius associated with the selected encounter type can be removed from the edges of the areas. For example, when placing the Tall16×16Hostile encounter, an encounter 216A may still fit within the circular area surrounding fountain 206, while an encounter 216B may then have a radius that extends beyond the removed sections associated with shopping center 208. Thus, encounter 216B may not be a valid encounter location, as there may not be sufficient space for an encounter of this type. Therefore, the removal of this potion can ensure that any point in the remaining area, even if it's at the edges of the area, can fit an encounter with that minRadius.

Upon determining that sufficient space exists for the placement of the encounter type, the maxScore rating can be checked to ensure that each of the possible encounter areas have a sufficient risk score necessary for the type of encounter. For example, a Tall16×16Hostile encounter may require at most a 0.2 risk score in order to be generated, as a large low-risk physical environment may be required in order to interact with such a large encounter. Thus, as noted earlier, assuming fountain 210 has a risk score of 0.1, the Tall16×16Hostile can be placed in this location, due to the area having a risk score that is less than the maxScore.

The placement locations of the most restrictive encounter type may be randomized, and placement may continue until the target count for that encounter type. Then, the placement process can proceed to the next most restrictive type of encounter (i.e., a Tall16×6Peaceful), and perform a similar placement process as described above. This interaction of encounter placement can continue until the target count for each encounter type is met or until a total percentage of zone 200 is filled with encounters. However, it is to be appreciated that encounters can be populated in any order, such as by starting with the least restrictive type of encounter.

The processing of zone 200 into the various gameplay locations has been described above with reference to retrieved geolocation data that may be provided by a data source. However, there may be portions of the world that do not have sufficient geolocation data, and satellite imagery may only be available for certain given areas of the world. For instance, in certain remote areas of the Yukon, there may be detailed satellite imagery, but no geolocation data may have been entered that describes the various physical elements present in the areas. In this instance, a machine learning algorithm can be utilized to parse the satellite imagery and return indications of possible physical elements, based at least on training data from known geolocation data.

For example, a machine learning algorithm may be trained on positive examples of lakes in a real-world environment. Thus, when the satellite images are parsed, the machine learning algorithm can automatically tag the area with geolocation data specifying the inferred type of physical element, and assign a risk score to that element. The inferred physical elements can then be utilized for the generation of gameplay elements, and if the machine learning algorithm incorrectly classified the physical element, such a classification can be reported by a user and/or modified by a moderator.

Example Moderator Experience

In order to effectively fine-tune the gameplay locations, a moderator can be provided with tools that can allow the moderator to visualize the current state of gameplay locations and specify new areas to potentially include or avoid. The moderator can also modify risk scores or priority scores for a given area, such as based on the misidentification of physical objects within an area. These modifications can be performed in response to user reports, which may provide details regarding a gameplay location, such as whether the gameplay location is in a location that is not ideal, such as on private property.

Figure 3A:
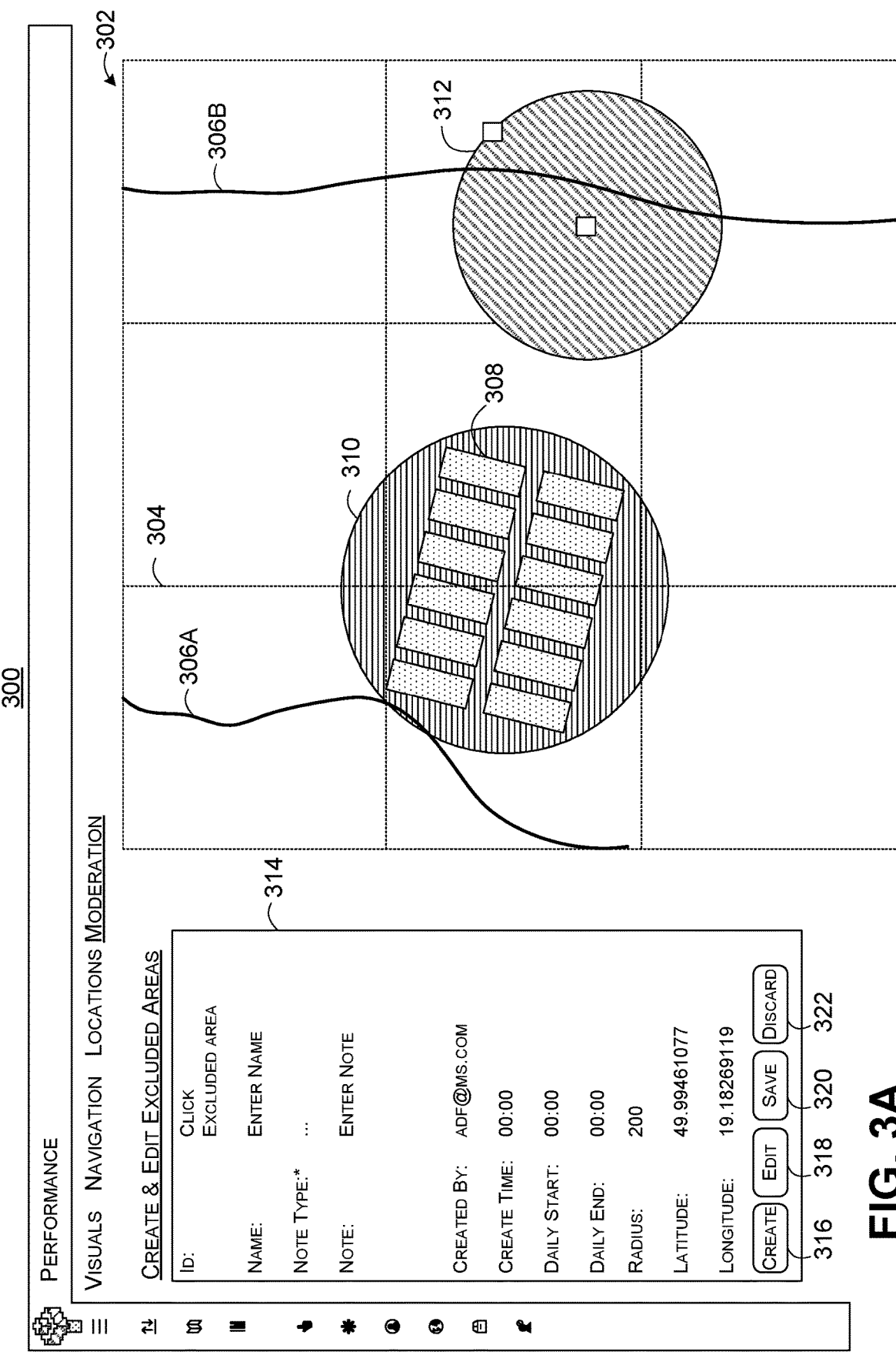
FIGS. 3A-3C illustrate example user interfaces that are consistent with some implementations of the present concepts
Figure 3B:
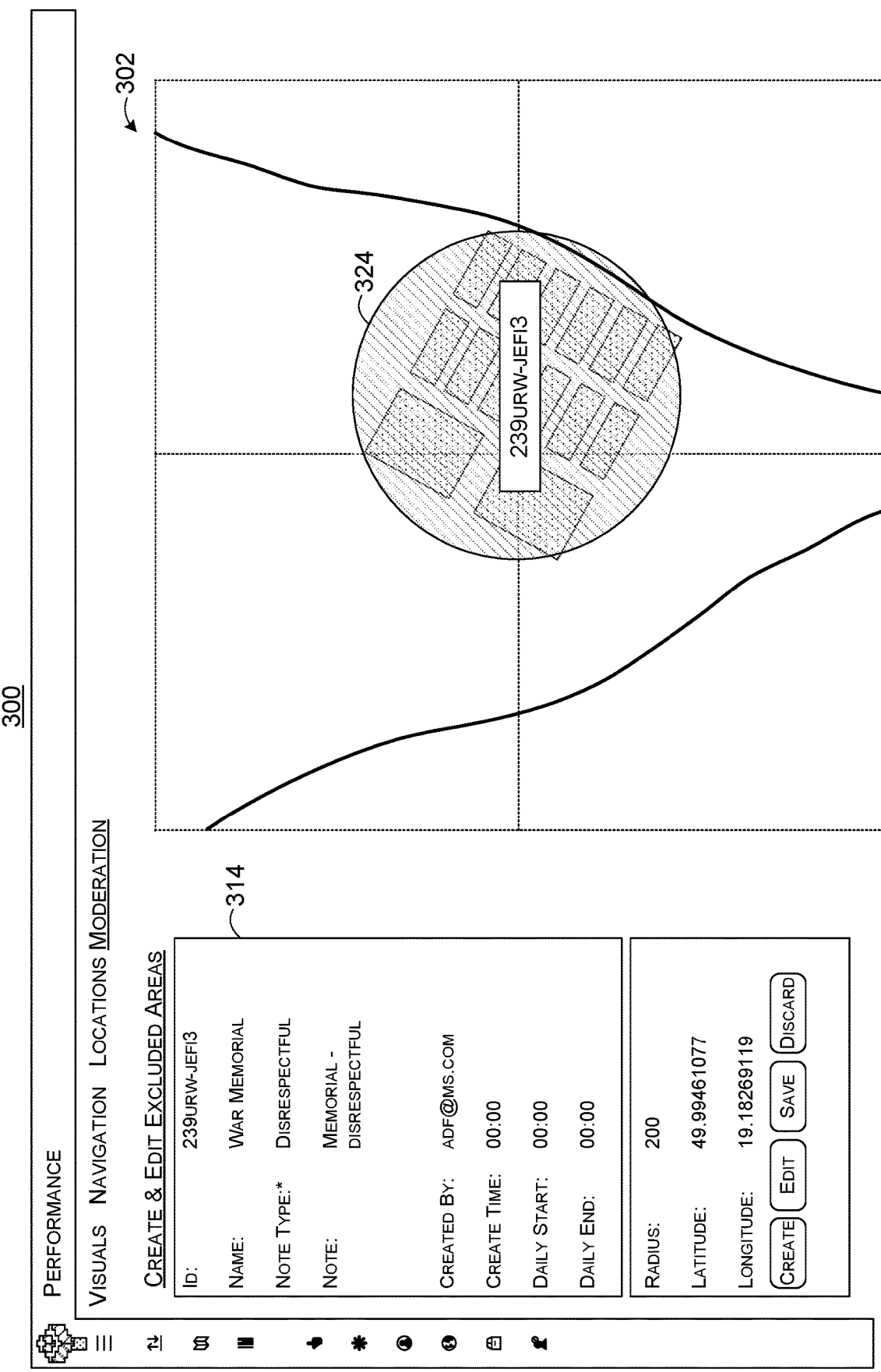
Figure 3C:
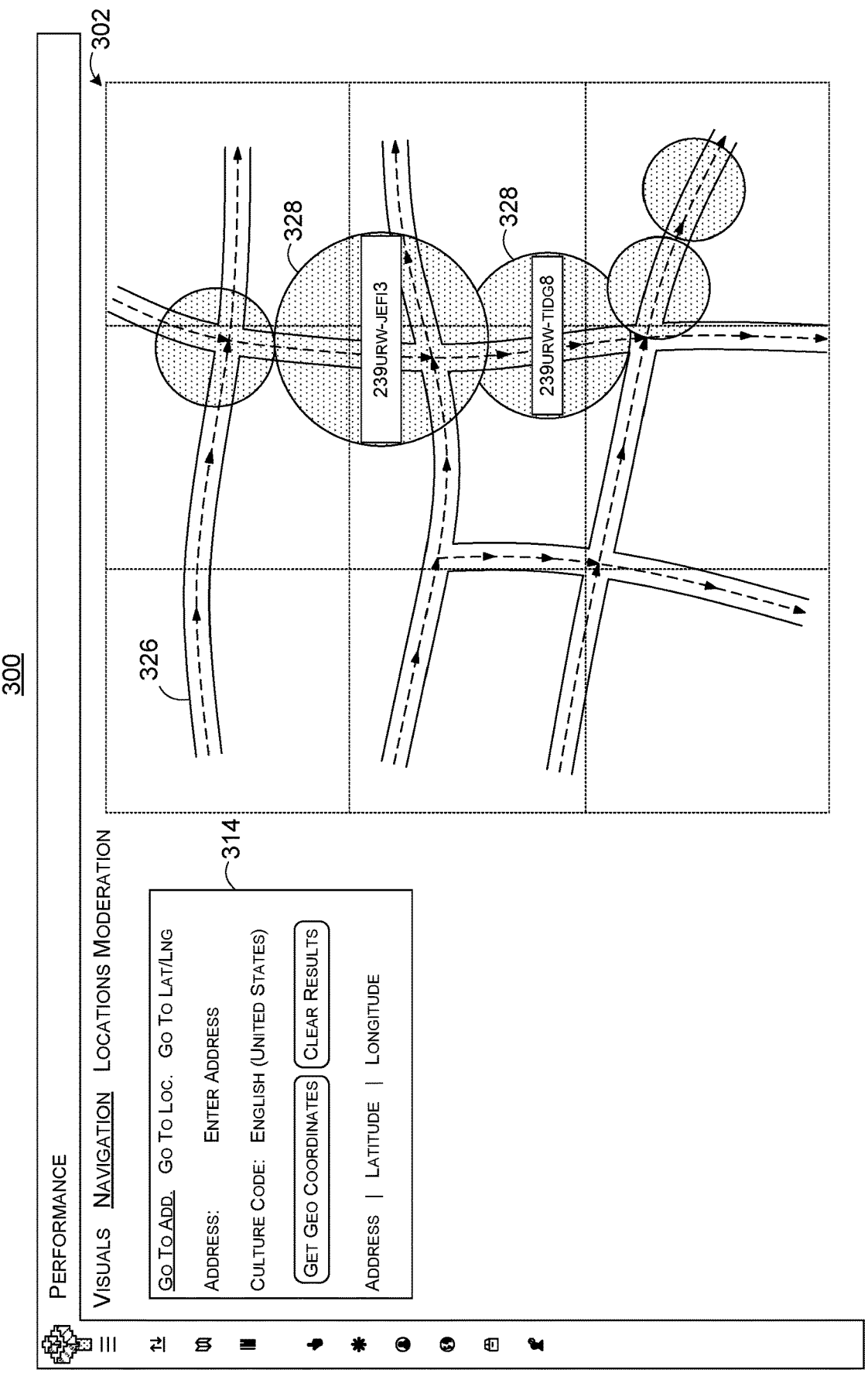

FIGS. 3A-3C depict various examples of GUIs that may be utilized to provide moderator functionality for the location generation algorithm. These GUIs illustrate various moderator functionality regarding the refinement of location generation; however, the GUIs are illustrative in nature, and the features described herein are applicable to systems that may receive settings from other users, or based on declarative rules or a machine learning model.

FIG. 3A depicts an example GUI 300 that can be used by a moderator to create and edit specific areas of a plurality of zones of geolocation data. GUI 300 may include a mapping element 302, which can depict a traditional mapping view or a satellite view of multiple zones 304 that can be displayed in a grid. Mapping element 302 may be capable of being zoomed in and out depending on the moderator's desire for granularity. As depicted, mapping element 302 may be zoomed such that nine zones can be displayed, and may present roadways 306A and 306B, and structures 308. Structures 308 may be, for example, a military base made up of a variety of buildings, and due to the nature of this physical element in the geolocation data, an exclusion zone 310 may have been provided around the area.

GUI 300 can be utilized by the moderator to create and/or edit excluded areas, which may be based on reports that can be issued by users during gameplay, or may be performed independently by the moderator due to risk concerns. For example, while exclusion zone 310 may encompass structures 308, there remains a possibility that a user traveling down roadway 306B may park at a rest area and encroach on the military base from the east. In order to reduce this risk, a moderator may utilize GUI 300 to create an exclusion zone 312 to encompass the rest area, in order to prevent any unintended encroachment of the military base.

GUI 300 may provide a data values region 314, which may show identifying data associated with an exclusion zone. Furthermore, region 314 may have a number of selectable options, such as a create option 316, an edit option 318, a save option 320, and a discard option 322. For example, if a moderator wanted to introduce exclusion zone 312 to the map, the moderator may click on create option 316, which may allow the moderator to draw a polygonal or circular region on the map indicating the size of the exclusion zone. Based on the drawn region, GUI 300 can determine the appropriate latitudinal and longitudinal coordinates of the exclusion zone, along with its radius.

The moderator can further edit any exclusion zones displayed on mapping element 302, such as by dragging and dropping the exclusion zone to another area of the map, which may update the latitudinal and longitudinal coordinates associated with that exclusion zone. Having drawn the appropriate exclusion zones, the moderator can save the changes using save option 320 or may discard any changes using discard option 322. While FIG. 3A depicts a circular exclusion zone, it is to be appreciated that GUI 300 may provide tools that can allow a moderator to draw a polygonal region to closely conform to the outline of a location on the map.

FIG. 3B depicts another example of GUI 300, where a moderator may utilize mapping element 302 to zoom and pan to certain areas of the world map to see various gameplay locations. As depicted, mapping element 302 can display an excluded zone 324 positioned over a real-world location, which in this instance is a war memorial. Upon clicking on the exclusion zone, data values region 314 can be populated with data relevant to the exclusion zone, so that the moderator can determine the reasons for the exclusion. For example, excluded zone 324 may have been entered because utilizing the area as a gameplay location may be disrespectful, and as such, data values region 314 can provide a note type category that presents the reason for the exclusion zone. The moderator can then reevaluate whether the exclusion zone is appropriate, may change the note type to a more accurate note type, or may expand or contract the radius of the zone as appropriate utilizing mapping element 302.

FIG. 3C depicts another example of GUI 300, where a moderator may navigate to a particular portion of the world map in order to view and edit gameplay settings associated with displayed zones. As depicted, mapping element 302 may be zoomed to a level of detail such that individual roadways 326 can be viewed. At this resolution, mapping element 302 may display a plurality of exclusion zones 328 (two of which are shown for example purposes), which the moderator can select and edit according to the GUI depicted in FIG. 3B. Alternatively, the moderator may utilize data values region 314 to select a particular address or a latitudinal/longitudinal coordinate. Based on the moderator input, mapping element 302 can display the requested portion of the map, to enable the moderator to provide feedback regarding the requested area.

Example Gameplay Element Generation Method

Figure 4:
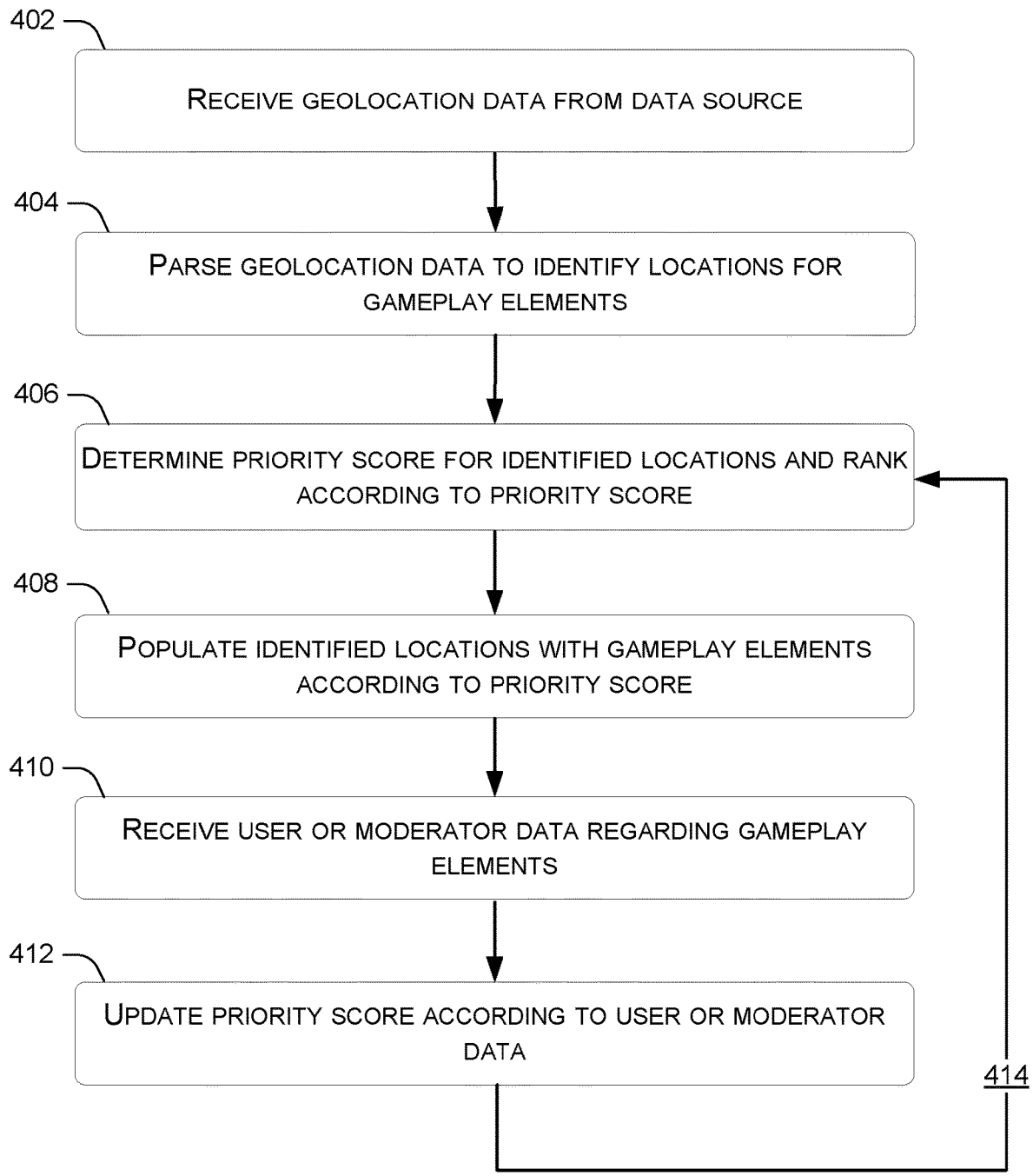
FIGS. 4 and 5 illustrate example methods or techniques that are consistent with some implementations of the present concepts.

The following discussion presents an overview of functionality regarding the generation of locations and gameplay elements at the locations according to one implementation. FIG. 4 illustrates an exemplary method 400, consistent with the present concepts.

At block 402, the method may receive geolocation data from a data source. As noted above, the data source may be a mapping database that stores geolocation data, which may be data representing details of a physical environment, such as buildings, streets, etc. Upon receiving the geolocation data, at block 404, the method can parse the geolocation data to identify locations for the placement of gameplay elements.

As noted earlier with respect to FIGS. 2A-2D, the parsing can determine a classification associated with the areas in the physical environment, and based on the classification of the areas, can determine whether certain areas may be utilized for gameplay purposes or whether the areas can be excluded. As such, at block 406, the method may determine a priority score for the identified locations, which may be based on pre-defined risk scores associated with the areas, and the identified locations can be ranked according to the priority score.

At block 408, the method can populate the identified locations with gameplay elements according to the priority score. In one implementation, locations that have a priority score above a threshold value, or that may have a risk score above a threshold value, may be activated to allow the placement of gameplay elements.

At block 410, the method may receive user or moderator data regarding the gameplay elements. For example, user interaction data with gameplay elements may indicate that a gameplay element is less popular than surrounding gameplay elements, and such information may warrant a modification of the priority score for the location. Alternatively, a user may report a problem with a gameplay element, which may be provided to a moderator for resolution. In some implementations, a moderator may provide direct feedback regarding locations, such as by providing exclusion zones over certain areas in a map, in order to improve user experience.

At block 412, the method may update the priority score according to the user or moderator data. As noted above, in instances where a location may not be popular with users, the priority score can be calculated on the basis of the risk score, the user data, and any moderator data, in order to potentially promote or demote the location or remove the location entirely from gameplay. Then, at step 414, the method may loop back to block 406 to re-rank the locations according to the updated priority score.

Figure 5:
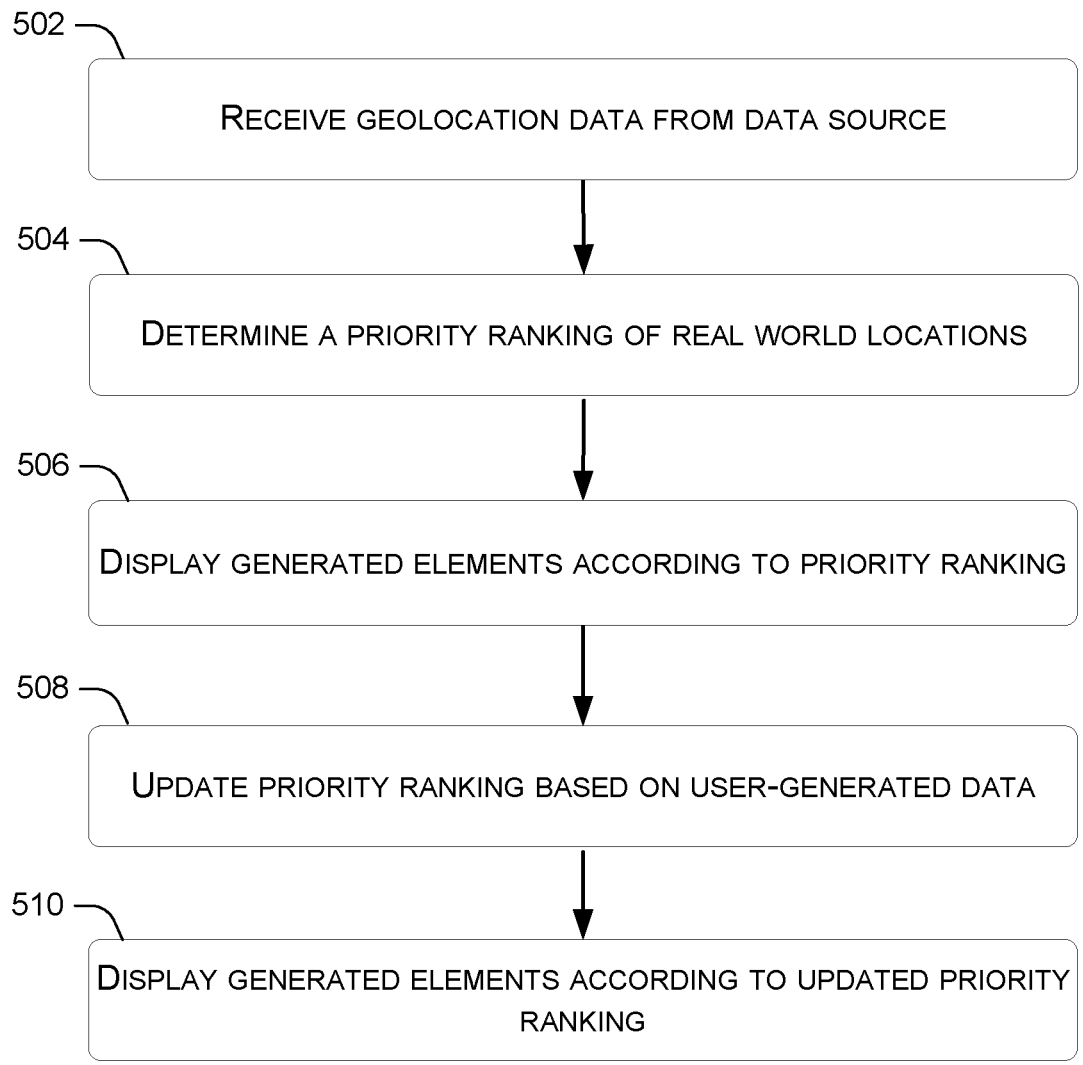

FIG. 5 illustrates an exemplary method 500, consistent with additional aspects of the present concepts. At block 502, the method may receive geolocation data from a data source. Next, at block 504, the method may determine a priority ranking of real-world locations defined by the geolocation data.

At block 506, the method may display generated elements according to the priority ranking, such as by displaying the generated elements on a screen of a device so that the generated elements can be perceived by a user.

At block 508, the method can update the priority rankings based on user-generated data. As noted earlier, user-generated data may be GPS data corresponding to the user or may be user generated reports regarding the augmented elements.

Finally, at block 510, the method can display the generated elements according to the updated priority rankings, such that the generated elements are updated based on the user-generated data.

Alternative Implementations

While the description presented above relates to the placement of gameplay locations and the quantifying of gameplay locations, it is to be appreciated that the concepted disclosed herein are not limited to only gameplay scenarios, but such techniques could also be applied to outdoor recreation or assisting with crowdsourcing and/or social distancing techniques. For example, a hiker may utilize a mobile device to download a nature application, which may present augmented directional indicators to the user during a hike. The augmented directional indicators may specify directions toward unique or interesting features that can be found along the hiking trail, but the base data that the directional system relies upon may be outdated. As such, by utilizing user feedback data, such as GPS data and/or reporting, specifics regarding the unique features can be updated, and the augmented directional indicators may be updated to reflect the changing circumstances regarding the features.

Alternatively, the present concepts could be utilized for tourism functionality, whereby an augmented tour trail can be provided to a user via a mobile device. Based on crowdsourced feedback from other user reports (i.e., "this area is too crowded" or "museum is closed"), the augmented tour trail can modify its routing to direct a tourist to more interesting tour spots on the fly. Thus, the performance of existing POIs can be continuously monitored and improved as necessary, thereby improving the tourist's experience.

Finally, the present concepts could be utilized to assist with social-distancing requirements, such that an augmented directional path can be specified for a user in providing directions to the user. For example, a user may request walking directions to a POI located nearby, and a most efficient path may be directly down a particular roadway. However, based at least on geolocation data and/or GPS data, a user may be advised of social crowding based on user feedback, and the walking directions may be appropriately updated based on such information.

Device Implementations

Figure 6:
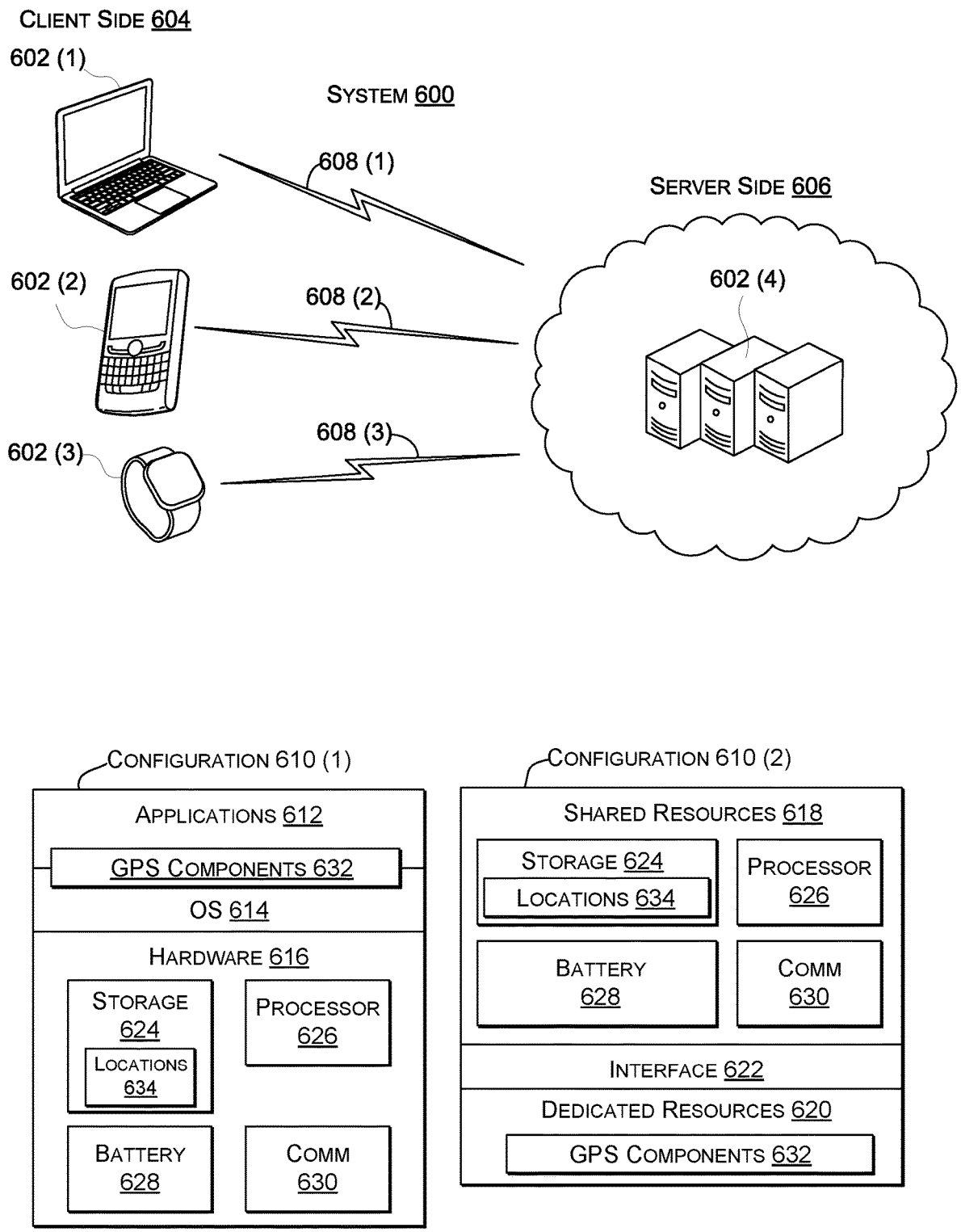
FIG. 6 illustrates an example system that is consistent with some implementations of the present concepts.

The present implementations can be performed in various scenarios on various devices. FIG. 6 shows a system 600 that can perform the disclosed location generation concepts. For purposes of explanation, system 600 can include devices 602(1), 602(2), 602(3), and 602(4). In this example, device 602(1) may be a laptop computer, device 602(2) may be a mobile device, device 602(3) may be a wearable smart device, and device 602(4) may be a server device. For purposes of explanation, devices 602(1)-602(3) can be viewed as being client-side or user-side devices 604, and device 602(4) can be viewed as being a server-side or cloud-based resource 606. The number of devices and the client-server side of devices described and depicted are intended to be illustrative and non-limiting. Devices 602 can communicate via one or more networks (represented by lightning bolts 608(1)-608(3)) and/or can access the Internet over the networks.

Each device 602 may perform method 400 and method 500 as a standalone device. For example, mobile device or a handheld GPS unit may perform both methods 400 and 500, thereby enabling interaction with gameplay elements. Alternatively, any or all of the acts in method 400 and/or method 500 may be distributed among a plurality of devices 602. For example, method 400 may be performed by device 602(4), while some or all of the acts of method 500 may be performed by client-side devices 604. One or more devices 602 may perform various combinations of acts in methods 400 and 500, depending on, for example, the processing and storage resources of the devices 602, as well as the communication capabilities among the devices 602. The specific examples of described implementations should not be viewed as limiting the present concepts.

FIG. 6 shows two device configurations 610(1) and 610 (2) that can be employed by any or all of devices 602. Individual devices 602 can employ either of configurations 610(1) or 610(2), or an alternate configuration. One instance of each configuration 610 is illustrated in FIG. 6. Briefly, device configuration 610(1) may represent an operating system (OS) centric configuration. Configuration 610(2) may represent a system on a chip (SOC) configuration. Configuration 610(1) can be organized into one or more applications 612, operating system 614, and hardware 616. Configuration 610(2) may be organized into shared resources 618, dedicated resources 620, and an interface 622 there between.

In either configuration 610, the device 602 can include storage/memory 624, a processor 626, a battery (or other power source) 628, and/or a communication component 630. The device 602 can also include a GPS component 632. The GPS component 632 provide locational information regarding the device and/or the user, for purposes of feedback in updating scoring of gameplay locations. Moreover, GPS component 632 can be utilized to determine a location of device 602, in order to appropriately determine what zones of geolocation data should be utilized.

The term "device," "mobile device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage memory that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include transitory propagating signals. In contrast, the term "computer-readable storage media" excludes transitory propagating signals. Computer-readable storage media include "computer-readable storage devices." Examples of computer-readable storage devices include volatile storage media, such as RAM, and non-volatile storage media, such as hard drives, optical discs, and flash memory, among others.

Examples of devices 602 can include traditional computing devices, such as personal computers, desktop computers, servers, notebook computers, cell phones, smart phones, personal digital assistants, pad type computers, mobile computers, cameras, appliances, smart devices, IoT devices, vehicles, etc., and/or any of a myriad of ever-evolving or yet to be developed types of computing devices.

As mentioned above, configuration 610(2) can be thought of as a system on a chip (SOC) type design. In such a case, functionality provided by the device can be integrated on a single SOC or multiple coupled SOCs. One or more processors 626 can be configured to coordinate with shared resources 618, such as memory/storage 624, etc., and/or one or more dedicated resources 620, such as hardware blocks configured to perform certain specific functionality. Thus, the term "processor" as used herein can also refer to central processing units (CPUs), graphical processing units (GPUs), controllers, microcontrollers, processor cores, or other types of hardware processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes system comprising a processor and a computer-readable storage medium storing computer-readable instructions, which when executed by the processor, cause the processor to: receive, from a data source, geolocation data describing elements in a physical environment, parse the geolocation data to identify locations for placement of gameplay elements, determine scores for the identified locations, and populate the identified locations with gameplay elements according to the determined scores for augmenting the gameplay elements over the physical environment.

Another example can include any of the above and/or below examples where the system further comprises a database, wherein the computer-readable instructions further cause the processor to store the identified locations and the determined scores in the database, and retrieve, from the database, a subset portion of the identified locations upon request.

Another example can include any of the above and/or below examples where the identified locations and the determined scores are stored in a lookup table of the database.

Another example can include any of the above and/or below examples where certain identified locations in the lookup table are marked as excluded for purposes of use as a gameplay location based at least upon the certain identified locations having scores that exceed a risk threshold.

Another example can include any of the above and/or below examples where the geolocation data comprises points, lines, and polygons that represent the elements in the physical environment.

Another example can include any of the above and/or below examples where wherein the computer-readable instructions further cause the processor to expand the points and lines of the geolocation data into polygons or circles.

Another example can include any of the above and/or below examples where the points and lines are expanded by a set amount that corresponds to the elements represented by the points and lines.

Another example can include any of the above and/or below examples where the determined scores are based at least on a classification associated with the identified location and feedback data regarding the identified location.

Another example can include any of the above and/or below examples where the determined scores for the identified locations are determined according to a linear function that takes into account the feedback data.

Another example can include any of the above and/or below examples where the feedback data is user feedback data regarding a user interaction with the gameplay elements.

Another example can include any of the above and/or below examples where the user feedback data comprises GPS coordinates indicating where the user is positioned relative to the gameplay elements.

Another example can include any of the above and/or below examples where the user feedback data is a report from the user about the gameplay elements.

Another example can include any of the above and/or below examples where wherein the feedback data is moderator feedback data.

Another example includes a method comprising receiving geolocation data from a data source, parsing the geolocation data to identify locations for augmented elements, determining a priority score for the identified locations, populating the identified locations with the augmented elements, and updating the priority score for the identified locations based at least upon user interaction data reflecting a quality of interaction for the augmented elements at the identified locations.

Another example can include any of the above and/or below examples where the method further comprises displaying the augmented elements overlaid on physical elements represented by the geolocation data.

Another example can include any of the above and/or below examples where the geolocation data comprises one or more pre-defined risk scores that correspond to the physical elements.

Another example can include any of the above and/or below examples where the priority score is based at least on classifications associated with the locations.

Another example includes a method comprising receiving geolocation data from a data source, determining a priority ranking of real-world locations associated with the geolocation data that enable user interaction with generated elements, displaying the generated elements at the real-world locations according to the priority ranking, updating the priority ranking for the real-world locations based at least upon user-generated data, and displaying the generated elements according to the updated priority ranking.

Another example can include any of the above and/or below examples where the user-generated data comprises GPS coordinates indicating where the user is positioned relative to the generated elements.

Another example can include any of the above and/or below examples where the priority ranking is based at least upon pre-defined risk scores that correspond to elements in the real-world locations.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
   a processor; and
   a computer-readable storage medium storing computer-readable instructions, which when executed by the processor, cause the processor to:
   receive, from a map database, geolocation data describing classifications of real-world elements and locations of the real-world elements in a physical environment;
   parse the geolocation data received from the map database to generate candidate locations for placement of gameplay elements;
   determine scores for the candidate locations based at least on:
     respective classifications associated with the candidate locations, the respective classifications being provided by the geolocation data received from the map database, and
     feedback data provided by users regarding the candidate locations; and
   populate at least some of the candidate locations with gameplay elements according to the determined scores, the gameplay elements augmenting the physical environment.

2. The system of claim 1, further comprising a database, wherein the computer-readable instructions further cause the processor to:
   store the candidate locations and the determined scores in the database, and retrieve, from the database, a subset portion of the candidate locations upon request.

3. The system of claim 2, wherein the computer-readable instructions further cause the processor to:
store the candidate locations and the determined scores in a lookup table of the database.

4. The system of claim 1, wherein the geolocation data received from the map database comprises points, lines, and polygons that represent the real-world elements in the physical environment.

5. The system of claim 4, wherein the computer-readable instructions further cause the processor to:
expand the points and lines of the geolocation data received from the map database into polygons or circles that define respective areas around individual real-world elements represented in the map database.

6. The system of claim 5, wherein the computer-readable instructions further cause the processor to:
based at least on corresponding classifications of the individual real-world elements, determine specified expansion areas for the points and lines;
expand the points and lines by the specified expansion areas to obtain the polygons or circles.

7. The system of claim 1, wherein the computer-readable instructions further cause the processor to:
mark certain geolocation data received from the map database as excluded for purposes of gameplay use.

8. The system of claim 1, wherein the feedback data is user feedback data regarding a user interaction with the gameplay elements by a user.

9. The system of claim 8, wherein the user feedback data comprises GPS coordinates indicating where the user is positioned relative to the gameplay elements.

10. The system of claim 8, wherein the user feedback data is a report from the user about the gameplay elements.

11. The system of claim 1, wherein the feedback data is moderator feedback data.

12. The system of claim 1, wherein the computer-readable instructions further cause the processor to:
determine the scores for the candidate locations is according to a linear function that takes into account the feedback data.

13. A method performed by a computing device, the method comprising:
receiving geolocation data from a map database, the geolocation data describing classifications of real-world elements and locations of the real-world elements in a physical environment;
parsing the geolocation data received from the map database to generate candidate locations for augmented elements;
determining priority scores for the candidate locations, the priority scores being based at least on the classifications of the real-world elements described by the geolocation data received from the map database;
in a first instance, populating the candidate locations with the augmented elements based at least on the priority scores;
updating the priority scores for the candidate locations based at least upon user interaction data reflecting a quality of interaction for the augmented elements at the candidate locations; and
in a second instance occurring after the first instance, populating the candidate locations with the augmented elements based at least on the updated priority scores.

14. The method of claim 13, further comprising:
in the first instance and the second instance, displaying the augmented elements over corresponding real-world elements represented by the geolocation data received from the map database.

15. The method of claim 13, wherein the real-world elements described by the geolocation data include buildings, parks, highways, streets, military bases, and terrain features.

16. The method of claim 15, wherein the priority scores are based on pre-defined risk scores for the classifications of the real-world elements in the physical environment.

17. A method performed by a computing device, the method comprising:
receiving geolocation data from a map database, the geolocation data describing classifications of real-world elements and real-world locations of the real-world elements in a physical environment;
determining a priority ranking of individual real-world locations associated with the geolocation data to enable user interaction with augmented elements, the priority ranking being based at least on individual classifications of individual real-world elements that are present at the individual real-world locations;
in a first instance, displaying the augmented elements on a display device at the individual real-world locations according to the priority ranking;
updating the priority ranking for the individual real-world locations based at least upon user-generated data; and
in a second instance, displaying the augmented elements on the display device at the individual real-world locations according to the updated priority ranking.

18. The method of claim 17, wherein the user-generated data comprises GPS coordinates indicating where the user is positioned relative to the augmented elements.

19. The method of claim 18, wherein the priority ranking is further updated based at least upon moderator feedback.

20. The method of claim 17, wherein the priority ranking is based at least upon pre-defined risk scores that correspond to elements in the real-world locations.

* * * * *